United States Patent [19]

Wood

[11] Patent Number: 4,519,738
[45] Date of Patent: May 28, 1985

[54] BOAT TRAILER

[76] Inventor: David C. Wood, Rte. 9, Box 830, Franklinton, La. 70438

[21] Appl. No.: 479,553

[22] Filed: Mar. 28, 1983

[51] Int. Cl.$^3$ .............................................. B60P 3/10
[52] U.S. Cl. ................................. 414/483; 280/414.1; 280/475; 414/494
[58] Field of Search ...................... 414/482, 483, 494; 280/414.1, 475; 224/42.12, 42.21, 42.24; 254/323

[56] References Cited

U.S. PATENT DOCUMENTS

| 2,834,492 | 5/1958 | Roy et al. | |
|---|---|---|---|
| 2,907,484 | 10/1959 | Parker | |
| 3,144,150 | 8/1964 | Cox | 414/494 X |
| 3,176,865 | 4/1965 | Faul et al. | 414/494 X |
| 3,797,681 | 3/1974 | Brettrager | 280/414.1 X |
| 4,219,213 | 8/1980 | Butcher | 280/475 |

Primary Examiner—Robert G. Sheridan
Attorney, Agent, or Firm—David L. Ray

[57] ABSTRACT

A boat trailer including a frame having a tongue rigidly connected thereto and an axle with wheels thereon connected to the frame by springs, the frame also having pivotally connected thereto a ramp mounted on the rearward end of the frame on an axis perpendicular to the longitudinal axis of the tongue of the trailer, the ramp being mounted independently of the wheels supporting the frame, the ramp having the major portion of its length extending forwardly of the perpendicular axis of the frame and a plurality of rollers mounted in the center thereof, and having two flat runners extending parallel and perpendicular to the pivotal axis of the ramp for supporting the weight of the boat.

11 Claims, 6 Drawing Figures

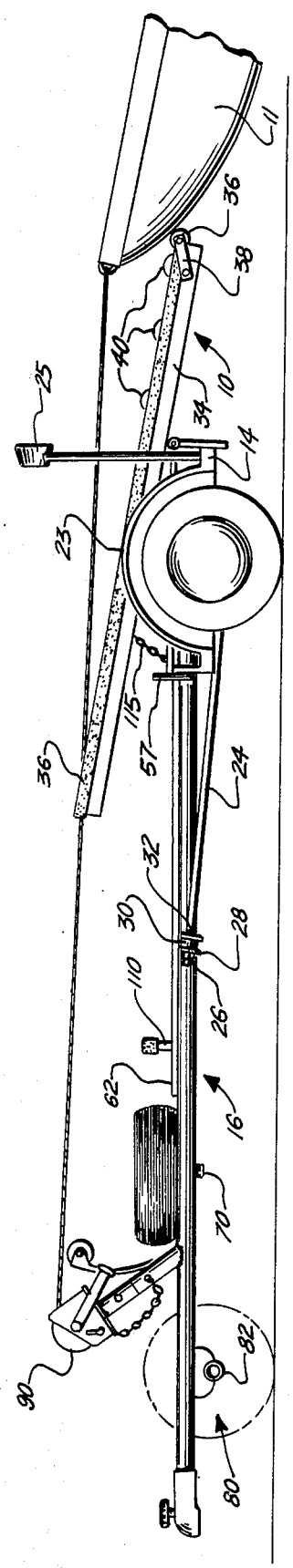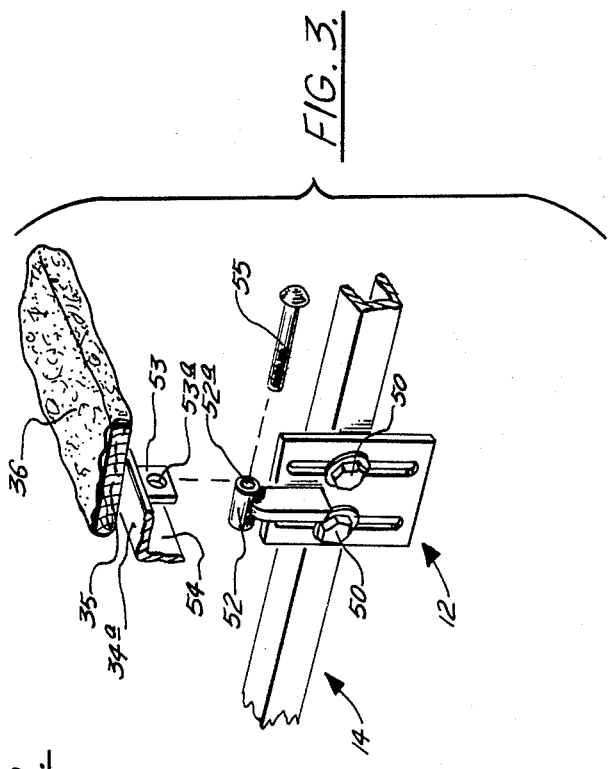
FIG. 2.
FIG. 3.

BOAT TRAILER

BACKGROUND OF THE INVENTION

The present invention relates to a trailer for carrying a boat from one location to another, and, in particular, to a trailer upon which a boat may be loaded and unloaded into and out of the water without placing the wheels or axle of the trailer in the water.

The boating market in the United States, since the advent of the outboard motor, has grown tremendously, especially in the last thirty years. Advances in outboard motor technology have resulted in the wide-spread use of reliable, compact, lightweight outboard motors on small boats ranging from ten feet or smaller on up to larger boats which may be used for ocean fishing and diving.

A large proportion of these boats are sold with trailers for transporting the boats to various bodies of water for launching. Boat trailers allow the boat owner much more flexibility in selecting the body of water in which he wishes to operate his boat, while at the same time permitting him to store his boat and motor at his residence or at another location convenient for periodic servicing, cleaning and maintenance.

Maintaining a trailer in good working order is essential for the safe transport of boats on the highway. The lights on the trailer must be in good working order and the boat owner must carefully inspect his axles, springs and other running gear frequently to prevent rust and corrosion which could cause the axles or springs to break on the highway or cause the bearings in the trailer axle to overheat and melt or deform. Such overheating of the bearings frequently causes the wheels to fly off the trailers, resulting in severe damages to the boat, motor and trailer and possible damage and injury to the vehicles and passengers in the vicinity at the time of the trailer failure.

One of the most common problems in maintaining a boat trailer in good working order and safe running condition for use on public highways is the rusting of the springs and axles of the trailer and the rusting of bearings on the trailer axle. Such rusting and corrosion is commonly caused by the axle, springs and bearings being repeatly wetted when launching and retrieving the boat from a body of water. Rusting and corrosion are particularly severe when the trailer is used to launch a boat in salt water.

It is very common when launching a boat to back the trailer into the water at an inclined concrete ramp until the axles, bearings and springs are beneath the surface of the water. When the trailer is pulled from the water, the water begins to dry and commonly rust begins to form on the axles, bearings and springs. After a days outing, the boat must be retrieved from the water in the same manner and the trailer wetted again. Such repeated wetting of the trailer over a long period of time can cause the corrosion, pitting, and rusting away of axles, bearings and springs, even if some of these elements are coated with rust preventive chemicals.

It is thus highly desirable that a boat trailer be provided from which a boat can be launched and retrieved without wetting the axle, springs and bearings of the trailer.

Furthermore, it is desirable that such a trailer be easily moved from one location to another with a minimum of operater effort even when detached from the towing vehicle.

SUMMARY OF THE INVENTION

In accordance with the present invention there is provided a boat trailer including a frame having a tongue rigidly connected thereto and an axle with wheels thereon connected to the frame by springs, the frame also having pivotally connected thereto a ramp mounted on the rearward end of the frame on a axis perpendicular to the longitudinal axis of the tongue of the trailer, the ramp being mounted independently of the wheels supporting the frame, the ramp having the major portion of its length extending forwardly of the perpendicular axis of the frame and a plurality of rollers mounted in the center thereof, and having two flat runners extending parallel and perpendicular to the pivotal axis of the ramp for supporting the weight of the boat. A spare wheel may also be mounted on the trailer and adapted to be attached to the trailer at the front of the tongue of the trailer to permit the trailer to be rolled on three wheels when detached from the towing vehicle. Furthermore, a wench mounted on the front of the tongue of the trailer has an extendable mounting post which permits the wench to be raised to a higher position for loading the boat, and then lowered to a position to exert a downward force on the front end of the boat.

The boat trailer of the present invention has the advantage that a very small portion of the trailer actually is placed in the water in which the boat is launched and retrieved, and therefore rusting is minimized. The axles, wheels, springs, bearings and running gear can be kept dry when launching or retrieving a boat with the trailer of the invention. The only portion which enters the water is the rearward end of the ramp which supports the weight of the boat.

Preferably the trailer of the present invention has a bracket attached to the tongue for holding a spare tire and a axle assembly connected to the spare tire which fits into and secures the tire to the holding bracket and which also can be received in a separate horizontal bracket connected to the front of the tongue to permit the trailer with the boat thereon to be rolled easily by the operator on three wheels even when the trailer is disconnected from the towing vehicle. Thus, when the towing vehicle is disconnected from the trailer, the boat owner can easily move his boat from one position to another and down a steep incline by attaching a rope or cable to the front end thereof to launch the boat from a trailer at a location remote from the towing vehicle or in places where the towing vehicle could not travel.

Furthermore, the trailer of the invention contains a winch on the front end of the tongue which can be raised to place the wench in a better position to pull the boat upon the trailer and then when lowered to hold the front end of the boat downward by exerting a downward force on the front end of the boat to keep the boat from bounching about on the trailer as the boat is being towed from one launching spot to another.

BRIEF DESCRIPTION OF THE DRAWINGS

The invention will be more fully understood by reference to the drawings in which:

FIG. 2 is a partially cut-away, side plan view of the trailer of the invention on which a boat is being loaded;

FIG. 3 is a partially cut-away, partially cross-sectional, exploded view of the pivot brackets connecting the ramp to the supporting frame;

DESCRIPTION OF THE PREFERRED EMBODIMENTS

Figure 1:
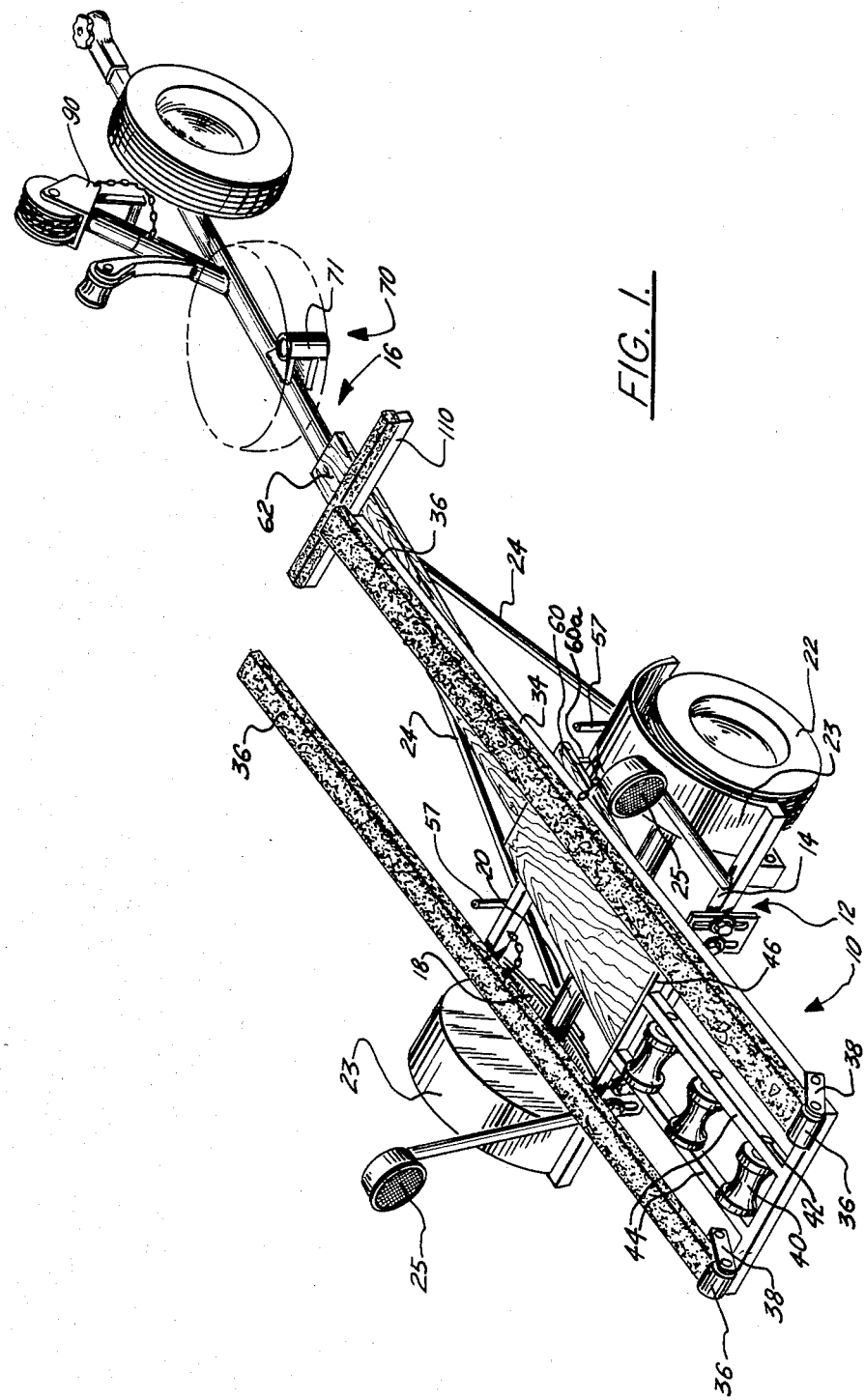
FIG. 1 is a perspective view of the trailer of the invention.

Referring now to the drawings, and FIG. 1 in particular, the trailer of the invention can be seen to include a ramp, generally indicated by the numeral 10 in FIG. 1, upon which the boat rests. The ramp 10 is pivotally connected by the brackets generally indicated by the numeral 12 to the rectangular support frame generally indicated by the numeral 14.

Figure 6:
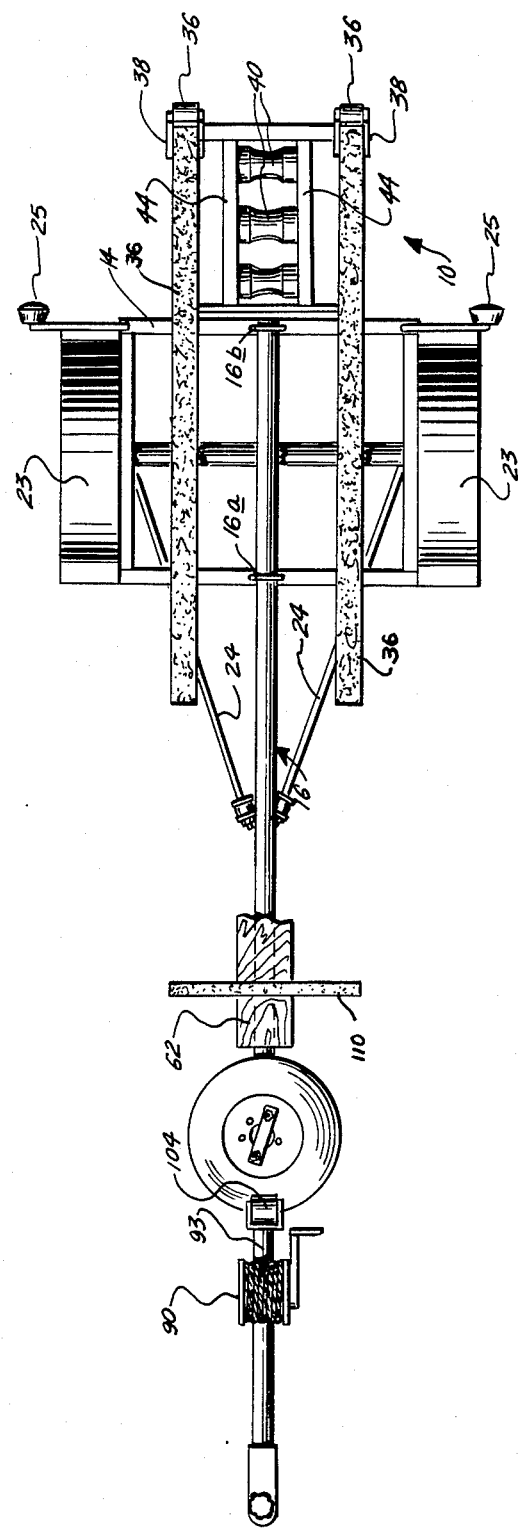
FIG. 6 is a top plan view, partially cut-away with the platforms removed.

The frame 14 has a tongue generally indicated by the numeral 16 rigidly connected thereto. Tongue 16 may be welded to frame 14 or it may be connected to frame 14 by U-bolts 16a and 16b as shown in FIG. 6. Frame 14 is also connected to axle 20 by springs 18. Axle 20 has wheels 22 connected thereto and has welded thereto braces 24—24. Wheels 22 are covered by fenders 23—23 which are welded to frame 14, and lights 25—25 may be connected to frame 14 as shown in the drawings. Braces 24—24 are threaded at the ends connected to tongue 16 and are connected to tongue 16 by nut 26—26 which fastens the threaded end of braces 24—24 to brackets 28—28. The braces 24—24 may also include a rubber bushing 30 acting in conjunction with washer 32 to permit the brace to move slightly as bushing 30 is compressed. Washer 32 is welded to brace 24—24 or rigidly fixed thereto by any conventional method. Also, braces 24—24 may be welded to tongue 16 if desired.

Ramp 10 has two horizontal boat support members 34—34 extending therefrom which support the boat. As shown in the drawings, boat support members 34—34 are made from angle iron steel channel, or square steel tubing. The bottom of the boat rests on flat members 35—35 which are connected to members 34—34 by bolts or the like. The members 35—35 which are constructed from wood and are preferably covered with a soft material such as carpet 36 or the like to prevent the bottom of the boat from being stratched or scarred.

Preferably, at the rearward end of the members 34—34 are two flexible rubber rollers 36 which are connected to ramp 10 by brackets 38. As can be seen in FIG. 2, the rollers 36 contact the front of the boat 11 to prevent the boat from striking an edge of the ramp 10 and scarring or scratching the boat.

As can be seen in FIG. 1, the ramp 10 is generally rectangular in shape and at the rearward end therefore are mounted three rollers 40 on axles 42 connected to parallel roller supports 44. Parallel roller supports 44 are connected to transverse ramp members 46 which are, in turn, rigidly connected to boat support member 34.

Pivot bracket 12 is bolted to frame 14 by bolts 50. Bracket 12 has a pivot bearing 52 which extends upwardly therefrom and is received between parallel vertical brackets 53 and 54 connected to support member 34. Bracket 54 is formed by the vertical portion of the angle iron forming boat support member 34 and bracket 53 is a vertical piece of metal welded to the bottom of the horizontal portion of boat support member 34a. Parallel brackets 53 and 54 have holes 53a and 54a therein which are aligned with the hole 52a in pivot bearing 52, and then pin 55 is inserted therein. Pin 55 may be held in place by a cotton pin or the like (not shown). Thus, ramp 10 will pivot about pin 55.

As can be seen in FIGS. 1 and 3, adjustable rests 57—57 are connected to the front portion of frame 14 by brackets. The bolts holding the brackets can be loosened and the rests may be moved upwardly or downwardly to level or adjust boat support members 34—34.

Preferably, two platforms 60 and 62 are placed over the portion of tongue 16 connected to frame 14 and to a portion of the remainder of tongue 16, respectively, to permit the boat operator to stand and walk thereon. Platform 60 is supported above tongue 16 by platform support members 60a which are connected to the front and rear of frame 14. Platform 62 can be connected to tongue 16 by U-bolts or any conventional means. Platforms 60 and 62 may be wood, plastic or metal, and preferably have a slip resistant surface.

Figure 4:
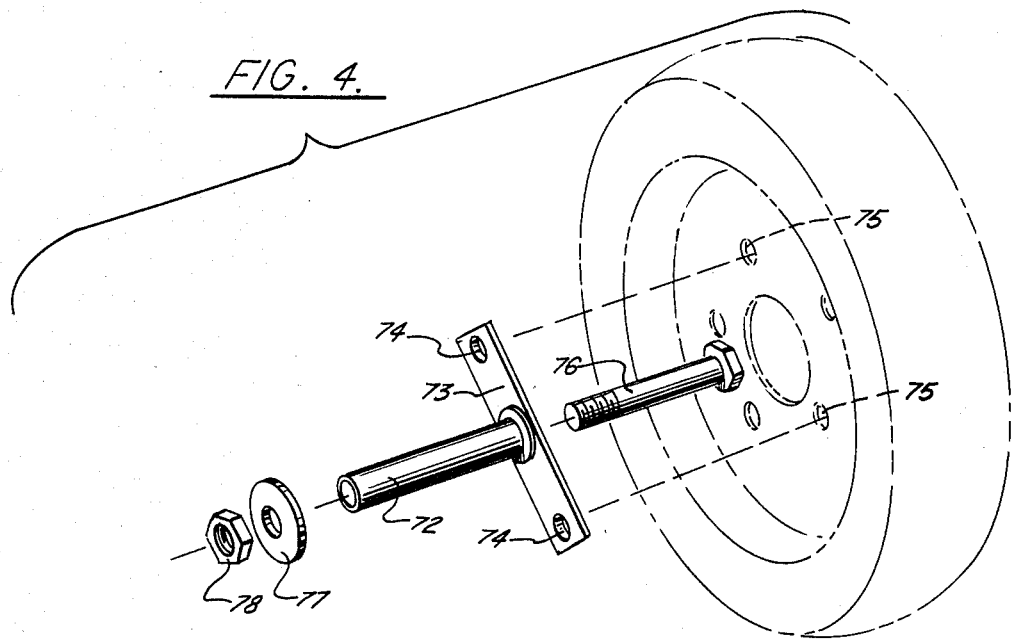
FIG. 4 is a perspective, exploded view of the axle assembly for attaching to the spare tire of the trailer of the invention.

Located on the side of tongue 16 toward the front is the spare tire storing bracket generally indicated by the numeral 70. The bracket 70 has a cylindrical socket 71 connected thereto for receipt of hollow axle 72 shown in FIG. 4. Axle 72 is rigidly connected to flange 73 which in turn is connected to the spare tire by bolts (not shown) which are fitted through holes 74—74 in flange 73 and holes 75—75 in the wheel of the spare tire shown in FIG. 4. A bolt 76 is fitted through hollow axle 72, washer 77, and into nut 78 to secure the spare tire to storing bracket 70. Storing bracket 70 has a hollow socket 71 which receives axle 72. Hollow socket 71 preferably is slightly longer than axle 72, bolt 76 is slightly longer than hollow socket 71, and thus washer 77 will contact the bottom of hollow socket 71 when nut 78 is threaded onto bolt 76.

The spare tire can also be used as a third wheel in conjunction with the bracket generally indicated by the numeral 80 shown in FIG. 1. Bracket 80 has a hollow socket 82 connected thereto as does bracket 70, except that hollow socket 71 is positioned vertically, whereas hollow socket 82 is positioned horizontally. Hollow socket 82 is slightly shorter than axle 72, and therefore, when axle 72 is inserted in hollow socket 82 and bolt 76 is inserted through axle 72, washer 77 will strike the end of axle 72 when placed over bolt 76 and nut 78 threaded thereon, and the spare tire and axle 72 will rotate freely in hollow socket 82. Thus, with the spare tire assembly of the invention, a spare tire can be securely mounted on the trailer and also used as a third wheel for moving the trailer by hand when the trailer is disconnected from the towing vehicle.

Figure 5:
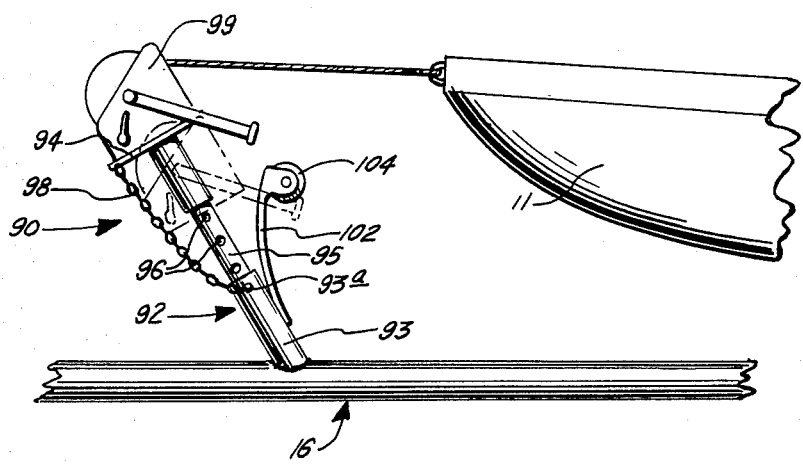
FIG. 5 is a partially cut-away, side plan view of the winch of the invention showing the winch in the upper and lower position.

In FIG. 5 is shown the winch assembly of the invention generally indicated by the numeral 90. Winch assembly 90 is connected to tongue 16 by adjustable winch post assembly 92. Winch post assembly 92 includes stationary post 93 preferably clamped to tongue 16, and movable post 95. Movable post 95 is slightly smaller in outside diameter than post 93 with holes 96 therein for receipt of a pin. The reduced diameter section 95 is slidably received in stationary post 93. Movable post 95 is held in the desired position by a pin inserted into one of the series of holes 96 and into hole 93a in stationary post 93. A security chain 98 is fastened to winch mount plate 94 and stationary post 93 to prevent the theft of movable post 95 and winch 99.

Thus, the winch assembly 90 permits winch 99 to be raised when the boat is being retrieved to apply an upward and forward force on the front of boat 11 for easy loading of the boat. The winch 99 may be lowered to the "ghosted in" position shown in FIG. 5 when the boat is loaded on the trailer to exert a downward force on the boat to hold the front end of the boat securely on the trailer.

A bumper 102 is preferably attached to stationary post 93 and is preferably made from a leaf spring. A rubber roller 104 is attached to the upper end to strike the end of the boat and prevent the boat from striking posts 93 and 94.

Preferably, platform 62 has a transverse front boat support 110 connected thereto for supporting the front end of boat 11. Boat support 110 preferably has carpet 36 thereon to avoid scratching or scarring the bottom of the boat.

Preferably, the portion of ramp 10 to the rear of brackets 12 is heavier than the portion of ramp 10 forward of brackets 12. Therefore, when there is no boat on ramp 10, the ramp will pivot about brackets 12 to the position shown in FIGS. 1 and 2. Chains 115—115 are provided to limit the amount by which the ramp 10 will pivot. Chains 115—115 are connected to the front portion of frame 14 and to the bottom of support frame 34. The length of chains 115—115 can be varied to vary the amount by which ramp 10 pivots.

Although the preferred embodiments of the present invention have been disclosed and described in detail above, it should be understood that the invention is in no sense limited thereby, and its scope is to be determined by that of the following claims.

What is claimed is:

1. A boat trailer adapted for launching and retriving a boat without wetting the axle and bearings of the trailer, comprising:
   a. frame means for supporting the boat;
   b. tongue means rigidly connected to said frame means for connecting said frame means to a vehicle towing said trailer, said tongue means having a first bracket means connected thereto for storing a spare tire, said first bracket means having a vertical, cylindrical socket for receipt of an axle assembly connected to the spare tire, the axle assembly including an axle perpendicularly connected to a flange rigidly connectable to said spare tire, second bracket means connected to the front portion of said tongue, said second bracket means having a horizontal, cylindrical socket for receipt of said axle assembly connected to said spare tire, means for holding said axle in said first bracket means and in second bracket means, said vertical socket connected to said first bracket means being slightly longer than said axle connected to said flange and said horizontal socket connected to said second bracket means being slightly shorter than said axle connected to said flange;
   c. an axle connected to said frame means by springs, said axle having wheels thereon;
   d. ramp means pivotally connected to said frame means at the rear of said frame means for receiving said boat, said rear of said frame means being located rearward of said axle, said ramp means being pivotally mounted on an axis perpendicular to the longitudinal axis of said tongue means, said ramp means being mounted independently of the wheels supporting said frame means and having the major portion of its length extending forwardly of said axis, said ramp means having a plurality of roller means mounted for aiding in loading a boat in the rear end thereof past said axis, said roller means being positioned in the center of said ramp means in alignment with said tongue of said trailer, said ramp means having two boat support means extending parallel to each other and perpendicular to said axis of said ramp means for contacting and supporting said boat, and
   e. means connected to said ramp means and to said frame means for limiting the height to which the front portion of said ramp means may rise.

2. The trailer of claim 1, wherein each of said two boat supports has a roller means at the rear end thereof for contacting said boat to prevent said boat from striking the edge of said ramp means.

3. The trailer of claim 2, wherein said frame means has stop means connected thereto upon which said ramp means rests when a boat is placed thereon.

4. The trailer of claim 3 wherein said stop means comprises two vertical pipes mounted on the front end of said frame means in alignment with said two boat supports means.

5. The trailer of claim 1 wherein said axle has brace means rigidly connected thereto and rigidly connected to said tongue means.

6. The trailer of claim 1 wherein said means for limiting the height to which the front portion of said ramp means may rise comprises a chain.

7. The trailer of claim 1 wherein said axle connected to said flange is a hollow cylinder, and said means for holding said axle connected to said flange in said first bracket means and said second bracket means is a bolt received in said hollow axle, a nut, and a washer, said bolt being longer than said vertical and said horizontal sockets.

8. The trailer of claim 1 wherein an adjustable winch assembly for loading a boat is connected to the front portion of said tongue means, said winch assembly comprising:
   a. a hollow stationary post rigidly connected to said tongue means,
   b. a hollow, movable post slidably received by said stationary post and extending upwardly therefrom,
   c. means for rigidly connecting said movable post to said stationary post in at least two different positions on said stationary post, and
   d. a winch connected to the top of said movable post.

9. The trailer of claim 1 wherein said means for rigidly connecting said movable post to said stationary post comprises a series of holes in said stationary post and said movable post alignable with each other, and a pin means for inserting in said aligned holes.

10. The trailer of claim 1 wherein said tongue has platform means connected to the top thereof for an operator of the trailer to stand and walk thereon, and a transverse boat rest means for supporting the front portion of a boat.

11. The trailer of claim 1 wherein said frame means has stop means connected thereto upon which said ramp means rests when a boat is placed thereon for transporting.

* * * * *